United States Patent [19]

Tingskog

[11] Patent Number: 5,060,787
[45] Date of Patent: Oct. 29, 1991

[54] BELT CONVEYOR AND CONVEYOR BELT THEREFOR

[76] Inventor: Lennart Tingskog, Kattegattsgatan 23, S-253 71 Helsingborg, Sweden

[21] Appl. No.: 488,055
[22] PCT Filed: Nov. 18, 1988
[86] PCT No.: PCT/SE88/00626
§ 371 Date: Aug. 15, 1990
§ 102(e) Date: Aug. 15, 1990
[87] PCT Pub. No.: WO89/05765
PCT Pub. Date: Jun. 29, 1989

[30] Foreign Application Priority Data

Dec. 18, 1987 [SE]  Sweden ................................ 8705052
Feb. 2, 1988 [SE]  Sweden ................................ 8800315

[51] Int. Cl.⁵ ............................................ B65G 15/40
[52] U.S. Cl. .................................... 198/819; 198/847
[58] Field of Search ................................ 198/819, 847

[56] References Cited

U.S. PATENT DOCUMENTS

| | | |
|---|---|---|
| 2,839,180 | 6/1958 | Ackers . |
| 2,998,121 | 8/1961 | Gilbert . |
| 4,230,221 | 10/1980 | Beresinsky . |
| 4,410,082 | 10/1983 | McGinnis ............ 198/819 X |
| 4,747,344 | 5/1988 | Hashimoto et al. ........ 198/819 X |
| 4,778,046 | 10/1988 | Hashimoto et al. ............ 198/819 |

FOREIGN PATENT DOCUMENTS

| | | |
|---|---|---|
| 0046690 | 3/1982 | European Pat. Off. . |
| 0050962 | 5/1982 | European Pat. Off. ............ 198/819 |
| 0168339 | 4/1986 | European Pat. Off. . |
| 1431684 | 5/1969 | Fed. Rep. of Germany . |
| 3417718 | 11/1984 | Fed. Rep. of Germany . |
| 3612765 | 10/1987 | Fed. Rep. of Germany ...... 198/819 |
| 571210 | 8/1945 | United Kingdom . |
| 2137950 | 10/1984 | United Kingdom ............... 198/819 |
| 2152000 | 7/1985 | United Kingdom ............... 198/819 |
| 8602621 | 5/1986 | World Int. Prop. O. ........... 198/819 |

Primary Examiner—D. Glenn Dayoan

[57] ABSTRACT

A conveyor belt of elastic material comprises a planar central part, two planar edge parts, and two hinge parts. The central part is flexurally rigid about the longitudinal axis of the belt by virtue of a first and a second transverse reinforcement layer and has a low extensibility in the longitudinal direction by a longitudinal reinforcement. One of the two planar edge parts is hingedly connected with each side edge of the central part. Both edge parts are flexurally rigid about the longitudinal axis of the belt by virtue of the first and a third and a fourth transverse reinforcement layers, and are further extensible in the longitudinal direction of the belt and have a total width which is at least equal to the width of the central part. One of two hinge parts interconnect an edge part with the central part. The hinge parts are flexible about the longitudinal axis of the belt and extensible in the longitudinal direction of the belt. The hinge parts are further resilient for pivoting the edge parts out from a position folded towards the central part, and have a substantially smaller width than the central part. The belt conveyor assembly, in which the conveyor belt is included, comprises support rollers for supporting the belt, and guides for maintaining the desired shape of the belt. The guides comprise pressing elements which, against the spring action of the hinge parts, hold the edge parts in the desired position relative to the central part.

35 Claims, 13 Drawing Sheets

BELT CONVEYOR AND CONVEYOR BELT THEREFOR

BACKGROUND OF THE INVENTION

The present invention relates to a belt conveyor assembly and a conveyor belt therefor.

Belt conveyors are previously known which comprise an endless conveyor belt of elastic material, support rollers for supporting the belt along at least part of its path, and guide means for maintaining the desired shape of the belt.

SUMMARY OF THE INVENTION

A first object of the present invention is to provide a conveyor belt and thus a belt conveyor which allows closed conveyance of goods, in the first place in that the belt itself encloses the goods along the conveying run, and which can eliminate spilling along the return run, said conveyor belt and belt conveyor permitting belt paths with narrow curves in the horizontal and the vertical direction and, accordingly, horizontal, inclined and even vertical path sections, and further permitting charging and emptying at any location along the goods conveying run.

A second object of the present invention is to provide a conveyor belt, the design of which is simple and the manufacturing cost of which is relatively low, but which nevertheless withstands rough operating conditions and has a long life.

A third object of the present invention is to provide a belt conveyor which is compact and does not require complicated support, guide or drive rollers.

It will be appreciated that a belt conveyor by means of which the above objects are achieved, is a universally applicable belt conveyor which is environmentally acceptable and implies low manufacturing, operating and maintenance costs.

No prior art belt conveyor achieving the above objects is available.

Belt conveyors with closed conveyor belts allowing vertical conveyance of bulk material are disclosed in e.g. GB-A-571,210, DE-A1-1,431,684 and U.S. Pat. No. 4,230,221. The conveyors according to the two first-mentioned documents are unfavourable, inter alia since they require complicated connecting means for holding the edge parts of the belt together, and the belt conveyor according to the last-mentioned document, which uses two conveyor belts, requires additional equipment in the form of pneumatic boxes to keep the edge parts of the two belts together.

A belt conveyor for open conveyance of goods is disclosed in U.S. Pat. No. 2,998,121. Here, the belt travels in a fully planar state along the return run, and therefore the conveyor is bulky and cannot prevent spilling of goods along the return run. The conveyor is further only suited to convey light goods and cannot be used for conveyance in the vertical direction or along paths with narrow horizontal curves.

A belt conveyor similar to the last-mentioned one for closed conveyance is disclosed in U.S. Pat. No. 4,709,806. Flexible covering flaps are here used to close over the goods. Nor is this conveyor applicable for vertical conveyance and, conveying runs with narrow horizontal curves are not possible.

According to the present invention, the objects stated above are achieved by means of a conveyor belt of elastic material, which is characterised by a planar central part which is flexurally rigid about the longitudinal axis of the belt by means of a transverse reinforcement and has a low extensibility in the longitudinal direction by means of a longitudinal reinforcement; two edge parts which are each hingedly connected with a side edge of the central part and flexurally rigid about the longitudinal axis of the belt by means of a transverse reinforcement, said edge parts further being extensible in the longitudinal direction of the belt and having a total width which is at least equal to the width of the central part; and two hinge parts which each connect one edge part with the central part and are flexible about the longitudinal axis of the belt and extensible in the longitudinal direction of the belt, said hinge parts further being resilient for pivoting the edge parts out from a position folded towards wards the central part, and having a substantially smaller width than the central part.

According to the invention, the above objects are further achieved by means of a belt conveyor of the type mentioned above, which is characterised in that the conveyor belt is of the type stated in the preceding paragraph, and that the guide means comprise pressing means which, against the spring action of the hinge parts, hold the edge parts in a desired position relative to the central part.

Having the edge parts folded towards the central part to a position substantially parallel thereto, the belt has the shape of a relatively flat package which is substantially rectangular in cross-section. As a result, the belt can be caused to follow narrow curves about a curve axis substantially parallel to the transverse direction of the belt. In the curves, the central part preferably is arranged inwardly of the edge parts, such that the tractive force exerted on the belt in the longitudinal direction thereof and taken up by the central part by means of the longitudinal reinforcement therein, can be directly transmitted to one or more support rollers in the curve inwardly of the central part. If the transverse direction of the belt before the curve is not parallel to the curve axis, this is provided at the beginning of the curve by turning the belt about its longitudinal axis. The purpose of the low extensibility of the central part thus is that the central part should substantially take up all tractive forces. However, the central part must have a minor extensibility, for example in the order of 1%, to make it possible to turn the belt about its longitudinal axis over a short distance. The extensibility of the edge parts should, however, be substantially higher, for example about 10%.

In relatively wide curves or in curves along the return run of the belt, the edge parts may, however, be allowed to pass on the inside of the central part.

In case the conveying run of the belt extends only horizontally or in moderate inclinations and does not require horizontal curves, the closing of the belt can be performed by a separate cover plate, the edge parts being kept substantially perpendicular to the central part. For conveying runs thus positioned, the total width of the edge parts need not exceed the width of the central part, whether said cover plate is used for closing the belt or such closing is carried out by folding the edge parts to a position substantially parallel to the central part. If the total width of the edge parts instead exceeds the width of the central part, the edge parts can in this case be kept in a position in which their free side edges engage each other, i.e. form an angle smaller than 90° with the central part. The belt thus is made triangular in cross-section.

If, however, the conveying run of the belt comprises steeply inclined or vertical sections or has one or more substantially horizontal curves, the total width of the belt edge parts must be larger than the width of the central part, such that the edge parts overlap each other at least along said sections and curves by being kept folded towards the central part in a position substantially parallel thereto or even in contact with the central part. For adjusting the cross-sectional area enclosed by the belt to the volume of the goods conveyed at each point of time, a resilient pressing-in of the overlapping portions of the edge parts and a given minimum pressure are required, when the edge parts in their innermost position make contact with the central part. Along horizontal or moderately inclined sections of the belt path, also the triangular cross-section can, however, be used.

Along the return run of the belt, the belt can be conducted with the same cross-sectional configuration as along the conveying run. To avoid the turning of the belt about the longitudinal axis of the belt, which is here required, the belt can, however, advantageously be conducted along the return run with the central part disposed above the edge parts. Any spilling of goods can here be avoided in that the edge parts are pressed upward towards the central part such that the lowermost portion of each edge part is positioned adjacent the hinge part. As a result, the edge parts form goods-collecting channels along the return run, the lowest point of said channels being quite close to the hinge parts. Any goods which after emptying remain on the insides of the central part and the edge parts will thus, if coming off these insides along the return run, be collected towards the lowermost point of the goods-collecting channels and be prevented from falling down under the return run.

A substantially complete closing of the goods-collecting channels along the return run can be obtained both in case where the total width of the edge parts is substantially equal to the width of the central part, since the free side edges of the edge parts in the folded condition then substantially engage with each other and/or with the inside of the central part, and in the case where the total width of the edge parts is larger than the width of the central part. In the latter case, such closing can be improved in that at least one edge part is provided with a flexible portion adjacent its free side edge.

The flexible portion can be seen as an extension of the edge part or as an integrated part thereof and can alone form the overlapping portion thereof. This means that the seal can be improved particularly in curves and vertical sections of the conveying run, the flexible extension portion preferably being positioned on the outside in the overlapping area. In horizontal curves where the transverse direction of the belt is vertical, the overlapping portion of the downwardly directed edge part should further always be arranged adjacent the central part, i.e. inside the upwardly directed edge part, thereby to establish an adequate seal.

The inventive conveyor belt can conveniently be given the required flexural rigidity of the central part and the edge portions by means of two reinforcement layers which are spaced apart in the direction of the thickness of the belt. The longitudinal reinforcement of the central part can be disposed between the two reinforcement layers.

The separate elements in the transverse reinforcement layers can be filamentary and be made of, e.g., metal or a fiber material. In their longitudinal direction, they should be highly resistant to traction and pressure, since this results in an extremely high flexural rigidity in the transverse direction of the central part and the edge parts.

Also the longitudinal reinforcement of the central part suitably consists of longitudinal elements of metal or a fiber material, such as steel, polyester, polyamide, etc. To obtain a low extensibility in the longitudinal direction, the separate reinforcing elements must be highly resistant to traction. And they should, more precisely, be dimensioned to be able to take up all forces required for stretching and pulling the belt. In view of the distance between the transverse reinforcement layers, the longitudinal reinforcement in the central part is preferably positioned between the two transverse reinforcement layers.

To obtain the required resilience of the hinge parts, they are preferably provided with a single layer of a transverse reinforcement, which can extend both through the central part and through the edge parts, i.e. as a reinforcement layer extending across the entire width of the belt. To obtain a suitable springiness and resilience of the hinge parts, the reinforcement layer therein can be positioned unsymmetrically, i.e. closer to one side of the belt, preferably the outer side. The resilience of the hinge parts should at least be so high that the edge parts, when folded over the central part, are held spaced apart therefrom. At the same time, the flexural rigidity of the central part and the edge parts should be so high that the hinge parts provide a defined hinge.

The pressing means of the belt conveyor, which can be fixed or resilient, may be of any suitable type, for example, rollers, a longitudinal bar and/or a further narrow belt with a longitudinal reinforcement. The two latter alternatives are particularly suitable along vertical belt sections. The bar preferably has a low friction surface.

To avoid any spilling of goods along the return run, the belt is, along the return run, preferably conducted with the central part positioned above the edge parts which are pressed up towards the central part such that the lowermost portion of each edge part is positioned adjacent the respective hinge part.

The inventive design of the belt makes it possible to pass the belt through extremely narrow curves both vertically and horizontally. This is a consequence of the hinge parts being of a substantially smaller width than the central part, and of the especially selected flexibility and rigidity of the different parts. Through curves, the belt is more precisely conducted with the transverse direction of the belt substantially in parallel with the curve axis, i.e. the transverse direction of the belt being perpendicular to the plane of the curve. If, at the beginning of a curve, the transverse direction of the belt is not parallel to said curve axis, this can be readily provided by turning the belt about its longitudinal axis. Since the central part is substantially the only part of the belt which takes up tractive forces, the central part should, at least through narrow curves, be conducted inside the edge parts.

The hinge parts can either be flexible over their entire width or consist of two flexible portions and one intermediate portion having the same design as the edge parts.

Steeply inclined belt sections, i.e. such having a greater inclination than the angle of repose of the conveyed goods are here considered equivalent to vertical belt sections. Belt sections having a smaller inclination than said angle of repose are thus considered equivalent to horizontal belt sections.

BRIEF DESCRIPTION OF THE DRAWINGS

Preferred embodiments of the invention will now be described in more detail with reference to the accompanying drawings in which

FIG. 22 illustrates a preferred variant of the belt conveyor part shown in FIG. 13;

DETAILED DESCRIPTION OF PREFERRED EMBODIMENTS

Figure 1:
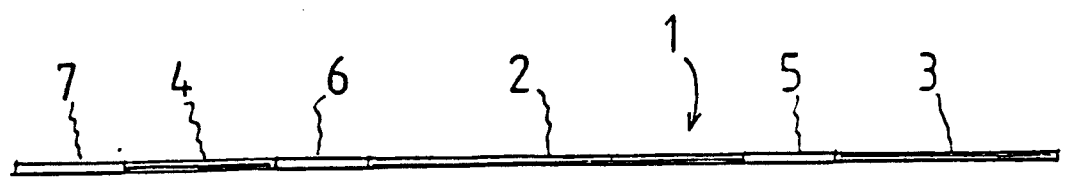
FIG. 1 is a cross-sectional view of a conveyor belt according to the invention, in a fully unfolded state.
Figure 2:
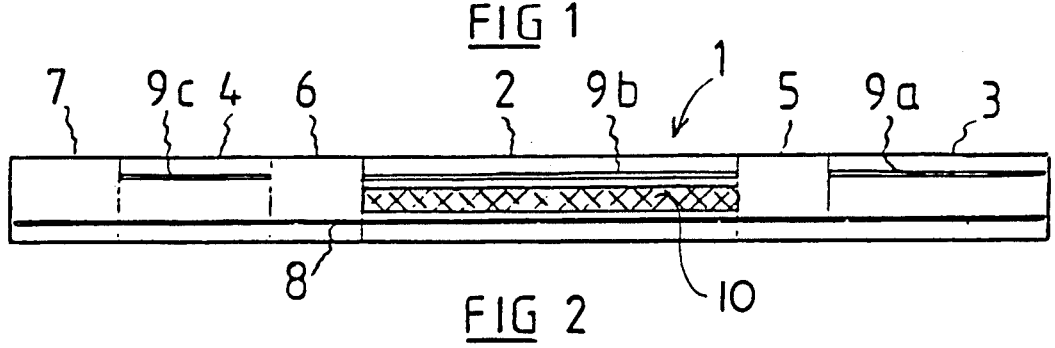
FIG. 2 is a cross-sectional view corresponding to the one shown in FIG. 1, the thickness of the belt being shown on an enlarged scale.

An embodiment of a conveyor belt 1 according to the invention is shown in FIGS. 1 and 2. The belt comprises a central part 2, two edge parts 3, 4 and hinge parts 5, 6 connecting the edge parts 3, 4 with the central part 2. The edge part 4 is further connected with an flexible extension portion 7. The belt 1 is made in one piece by the vulcanising of several layers of e.g. rubber upon each other, with inserts of different reinforcement layers.

A preferred embodiment of the reinforcement layers is shown in FIG. 2, where the thickness of the belt 1 is exaggerated in relation to its width. A first reinforcement layer 8 comprises transverse fibers or filaments which are highly resistant to traction and pressure, and is unsymmetrically positioned in the belt 1, i.e. in relation to the geometrical center plane of the belt. A second transverse reinforcement layer 9 comprises three parts 9a, 9b, 9c, the extent of which corresponds to the extent of the edge part 3, the central part 2 and the edge part 4, respectively. The part 9c may also extend across the flexible extension portion 7. The reinforcement layer 9 is of the same type as the reinforcement layer 8. A third reinforcement layer 10 has the same extent as the central part 2 and is arranged between the reinforcement layers 8 and 9b. The reinforcement layer 10 comprises longitudinal fibers or filaments having a high tensile resistance and can also be conventional cord.

The fibers or filaments in the reinforcement layers may consist of metal, for example, steel, or plastic, for example, polyester or polyamide, or carbon fibers. The belt 1 itself may consist not only of rubber but of plastic or a mixture of plastic and rubber.

The conveyor belt 1 according to the invention thus is manufactured in a fully planar state and is composed of a central part 2 and two edge parts 3, 4 which are all flexurally rigid in the transverse direction of the belt or about the longitudinal axis of the belt. The central part 2 and the edge parts 3, 4 will thus act as substantially rigid plates which are hingedly connected with each other via the hinge parts 5 and 6. The extremely high flexural rigidity is obtained by means of the reinforcement layers 8 and 9 which, in the direction of the thickness of the belt, are spaced apart and which, in the transverse direction of the belt, are highly resistant to traction and pressure. In contrast to the central part 2, the edge parts 3, 4 are highly extensible in the longitudinal direction of the belt, and this also applies to the hinge parts 5, 6. The hinge parts 5, 6 which are flexible relative to the longitudinal axis of the belt have, however, a certain springiness which in the embodiment shown is obtained by the transverse reinforcement layer 8 and which forces the edge parts to pivot out from the central part, when they are folded towards the central part. This resilience is at least so high that the edge parts are held spaced from the central part, but preferably is such that the edge parts are pivoted out to the position shown in FIGS. 1 and 2. Although the hinge parts 5, 6 should thus have a defined springiness or a certain resistance to bending, this must be much lower than the resistance to bending of the central part 2 and the edge parts 3, 4, such that a defined hinge is provided.

The extension portion 7 is conveniently of the same structure as the hinge parts 5, 6.

A belt design as described above with reference to FIGS. 1 and 2, provides for many different belt configurations. Examples of such configurations are shown in FIGS. 3-9.

Figure 3:
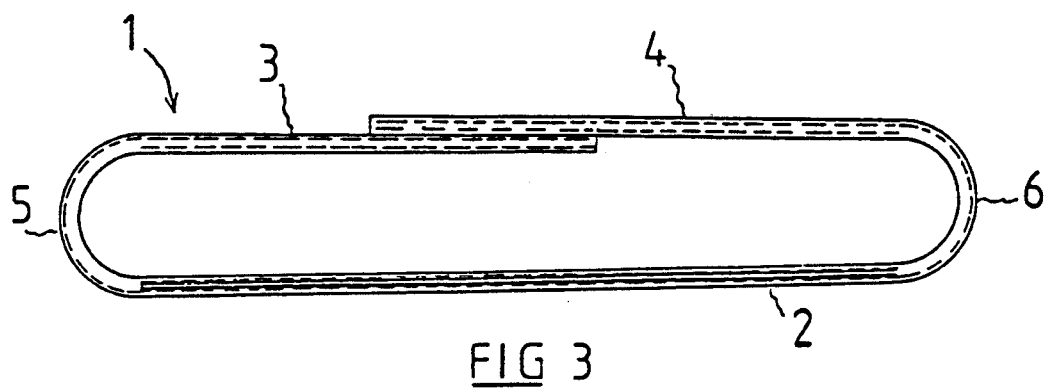
FIGS. 3-6 are different cross-sectional views of the conveyor belt according to the invention, the total width of the belt edge parts being larger than the width of the central part.

In the belt configurations shown in FIGS. 3-6, the total width of the edge parts 3, 4 is larger than the width of the central part 2. This means that an overlapping as shown in FIG. 3 can be effected between the outer portions of the edge parts 3, 4. By means of such overlapping, a safe enclosure of the conveyed goods is obtained. In the embodiments shown in FIGS. 3 and 5, the edge parts 3, 4 are flexurally rigid over their entire width, whereas the edge part 4 in FIG. 4 has a flexible extension portion 7 and the edge parts 3, 4 in FIG. 6 each have a flexible extension portion 7.

Figure 4:
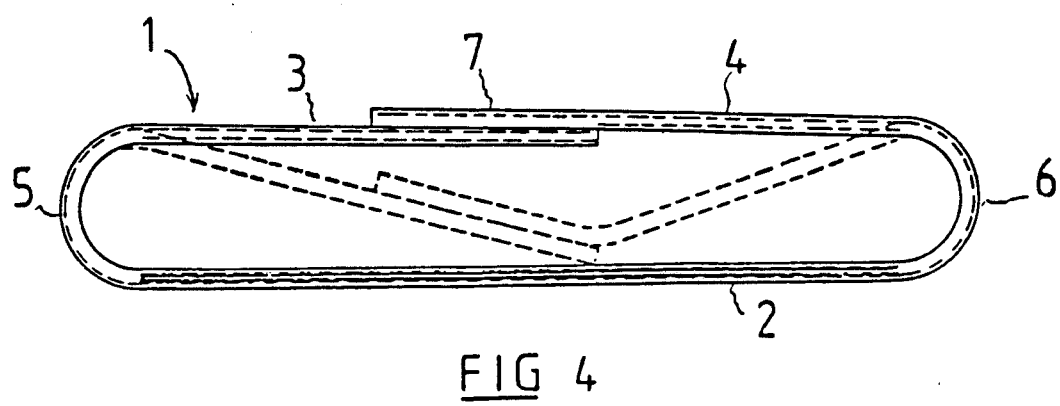
Figure 5:
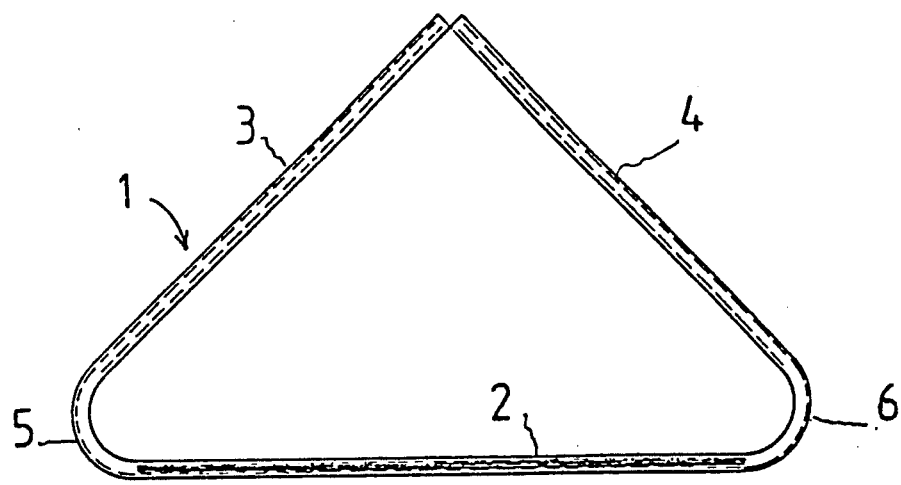
Figure 6:
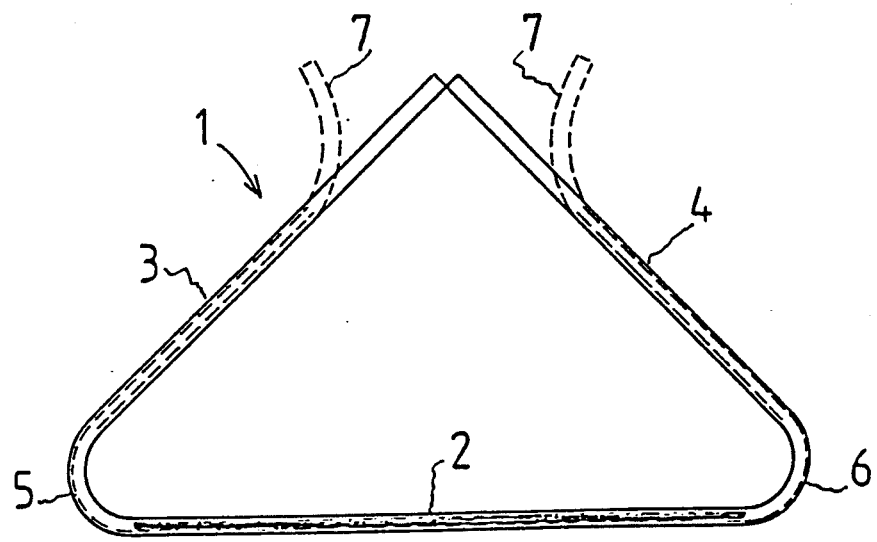
Figure 7:
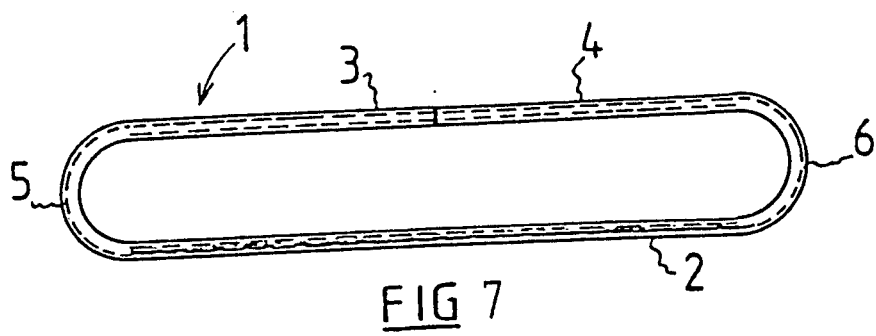
FIGS. 7-9 are different cross-sectional views of the conveyor belt according to the invention, the total width of the belt edge parts being approximately equal to the width of the central part.
Figure 8:
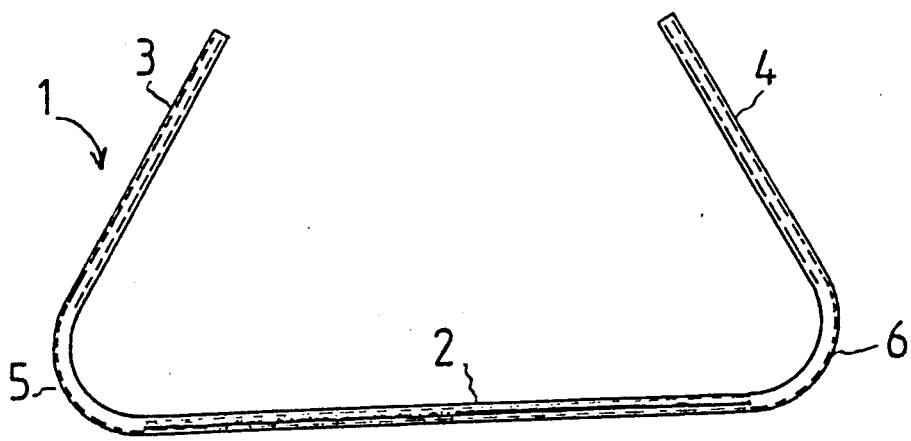
Figure 9:
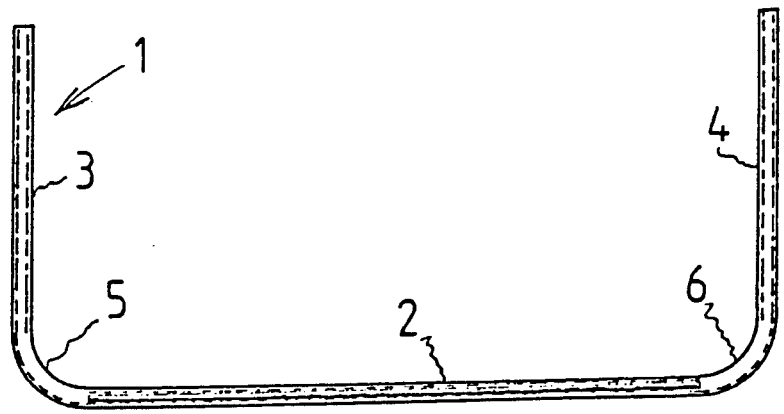

The belt configuration shown in FIG. 3 or 4 is required along steeply inclined or vertical sections of the belt path of the conveyor belt, and this applies also when the belt path follows a substantially horizontal curve. In this case, the edge parts 3, 4 must, in fact, overlap one another for safe enclosure of the conveyed goods. The belt configuration in FIG. 5 can, however, be used along sections of the belt path which are horizontal or moderately inclined. The belt configuration in FIG. 6 is particularly convenient when filling of goods should occur along a goods conveying run.

The preferred embodiment of the conveyor belt 1 according to the invention for belt conveyors with vertical goods conveying sections is the one shown in FIG. 4, since in this embodiment the enclosed cross-sectional area can, by suitable pressing means, be adapted to different flows of goods, while maintaining a safe enclosure. The smallest cross-sectional area is then formed, as shown by dashed lines in FIG. 4, when the edge parts 3, 4 are folded into engagement with the central part 2.

When the triangular cross-sectional configuration is used along the entire goods conveying run, the width of the hinge parts 5, 6 can be made smaller than in the cases where a cross-sectional configuration according to FIG. 3 must be used, since in the former case the width of the hinge parts 5, 6 is not decisive of the cross-sectional area of the conveyor belt, i.e. its conveying capacity.

Figure 19:
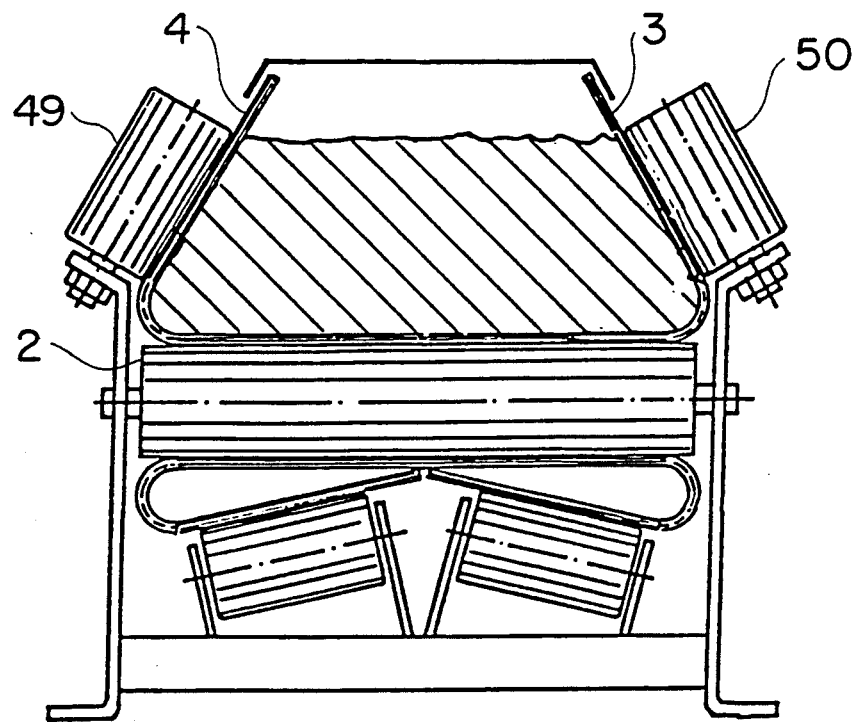
FIG. 19 is a cross-sectional view of the inventive belt conveyor having the cross-sectional shape of the conveyor belt as shown in FIG. 8.
Figure 20:
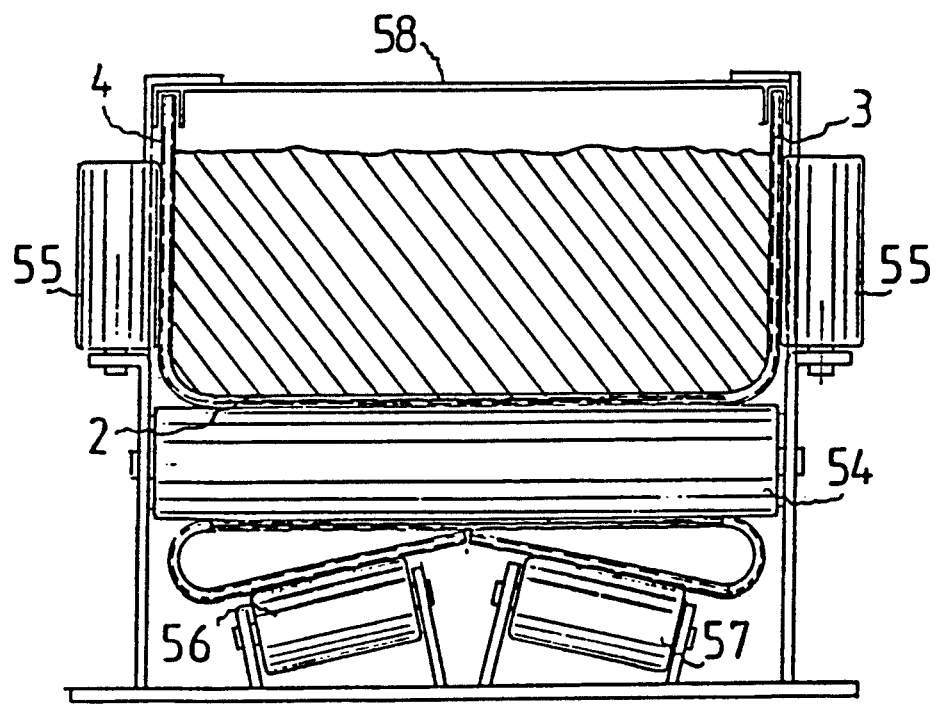
FIG. 20 is a cross-sectional view of the conveyor belt shown in FIG. 9 in the inventive belt conveyor.

For belt conveyors having a goods conveying run which extends only horizontally or with a moderate inclination and without curves, the total width of the edge parts 3, 4 need not exceed the width of the central part 2. The belt configurations shown in FIGS. 7-9 can then be used. In the configuration shown in FIG. 7, an almost completely closed conveyor belt is obtained in any case, in that the edge parts 3, 4 are kept folded down to a position parallel to the central part 2. In the configurations shown in FIGS. 8 and 9, the goods can be conveyed openly, but it is also in this case possible to make the conveyance of goods closed by means of a cover plate, as shown in FIGS. 19 and 20. The edge parts 3, 4 can then make a right or acute angle with the central part 2.

Figure 10:
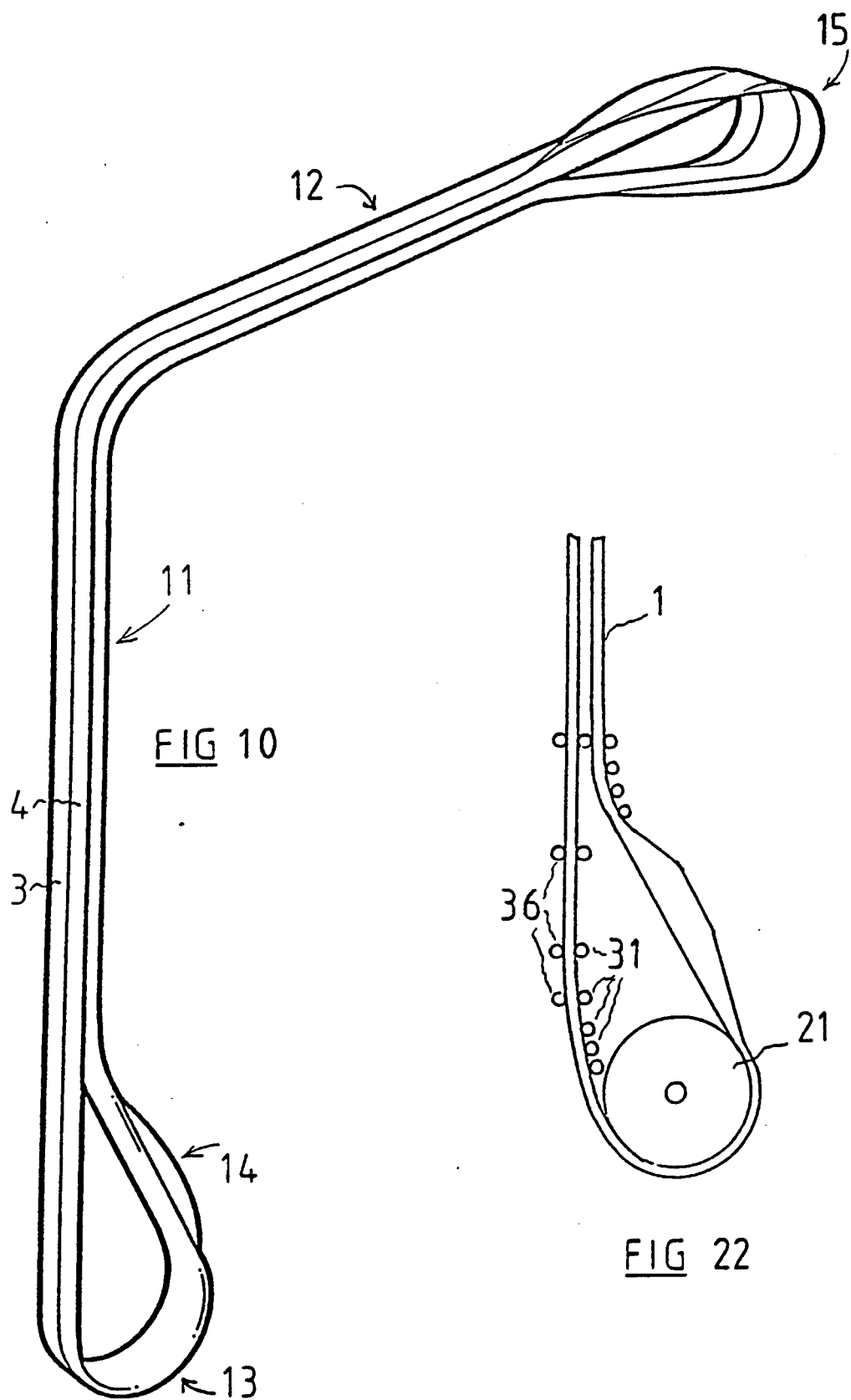
FIGS. 10 and 11 illustrate examples of possible belt paths with a conveyor belt according to FIGS. 3-6.

FIG. 10 shows a possible belt path for the conveyor belt according to the invention. The conveyor belt 1 in FIG. 10 is more precisely of the type having edge parts 3, 4 overlapping one another, and is most preferably of the type shown in FIG. 4. The conveying run comprises a vertical path section 11 and a horizontal path section 12 connecting therewith. The section 11 is preceded by a belt turning point 13, and a filling station 14 is positioned immediately above the turning point 13. At the end of the horizontal path section 12, there is a combined turning point and emptying station 15. From the turning point 15, the belt 1 extends along a return run to the filling station 14. The return run extends in parallel with the horizontal path section 12 and the vertical path section 11. In the filling station 14, a filling hole is provided by unfolding the edge parts 3, 4. An example of a filling device will be described in detail later. The belt then travels in a closed state, i.e. with overlapping edge parts 3, 4 almost up to the emptying station 15. Here the edge parts 3, 4 are unfolded so that the belt 1 passes the turning point and emptying station 15 in its lay-flat condition.

Figure 11:
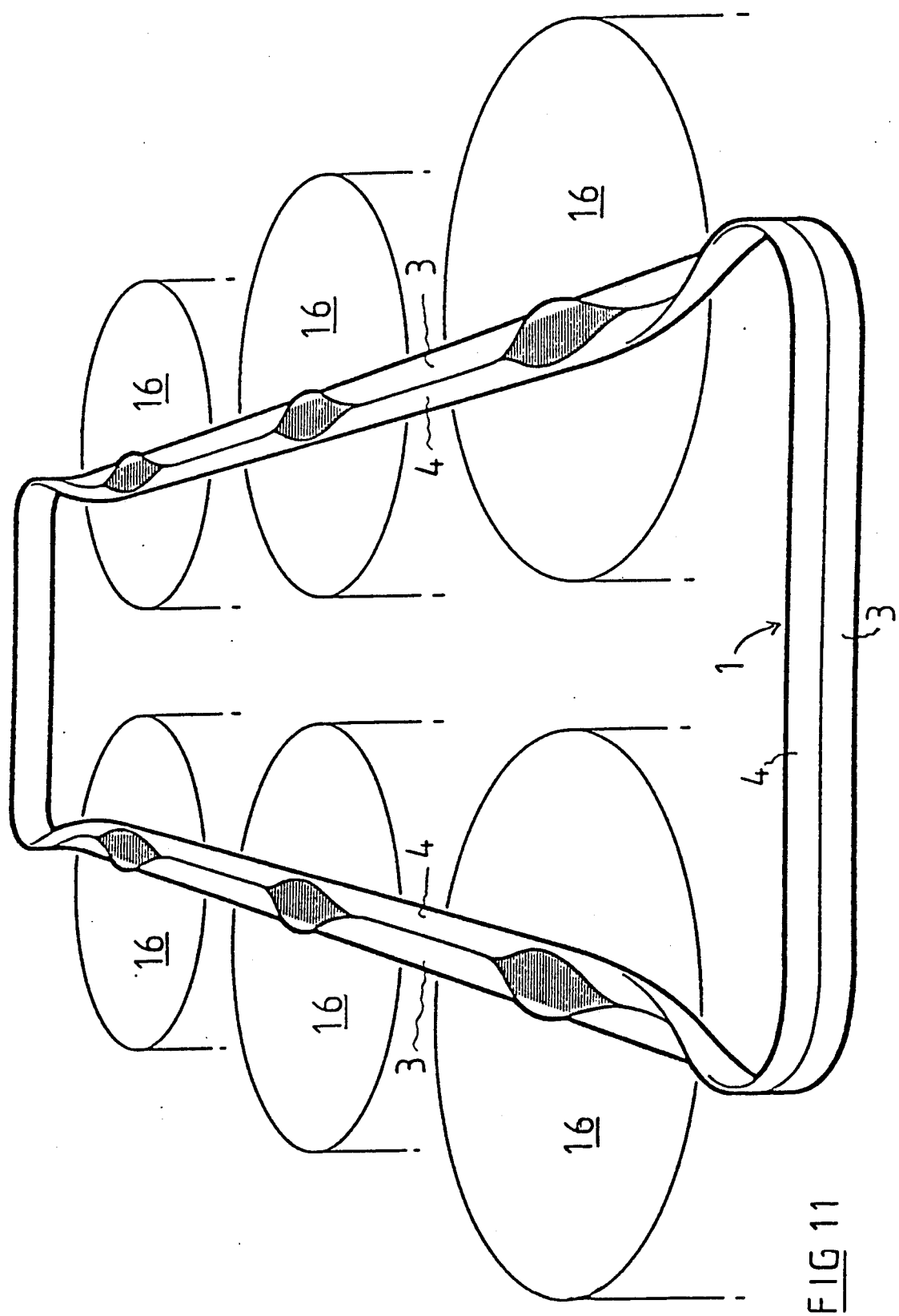

FIG. 11 illustrates an example of a belt path for the belt conveyor according to the invention in a silo plant. In the example, the plant comprises six silos 16 each having a filling and/or emptying station where the belt 1 has been opened by unfolding the edge parts 3, 4. The belt conveyor in FIG. 11 thus forms a goods distribution loop comprising two straight belt sections each positioned across a row of the silos 16, and two similarly straight connecting sections. Along the two former sections, the central part of the belt conveyor extends horizontally, while it extends vertically along the connecting sections. In the curves connecting the different sections, the transverse direction of the belt is also vertical, and to this end, the belt 1 is turned about its longitudinal axis at the beginning and, respectively, at the end of each curve from and, respectively, to the straight belt sections above the silos 16.

The preferred goods conveying position of the belt 1 is the one where the load is supported by the central part 2, i.e. this forms the bottom part, but goods can also be conveyed with the belt travelling on its edge, such as in horizontal curves and also otherwise along shorter sections, such as the abovementioned connecting section shown in FIG. 11.

Figure 12:
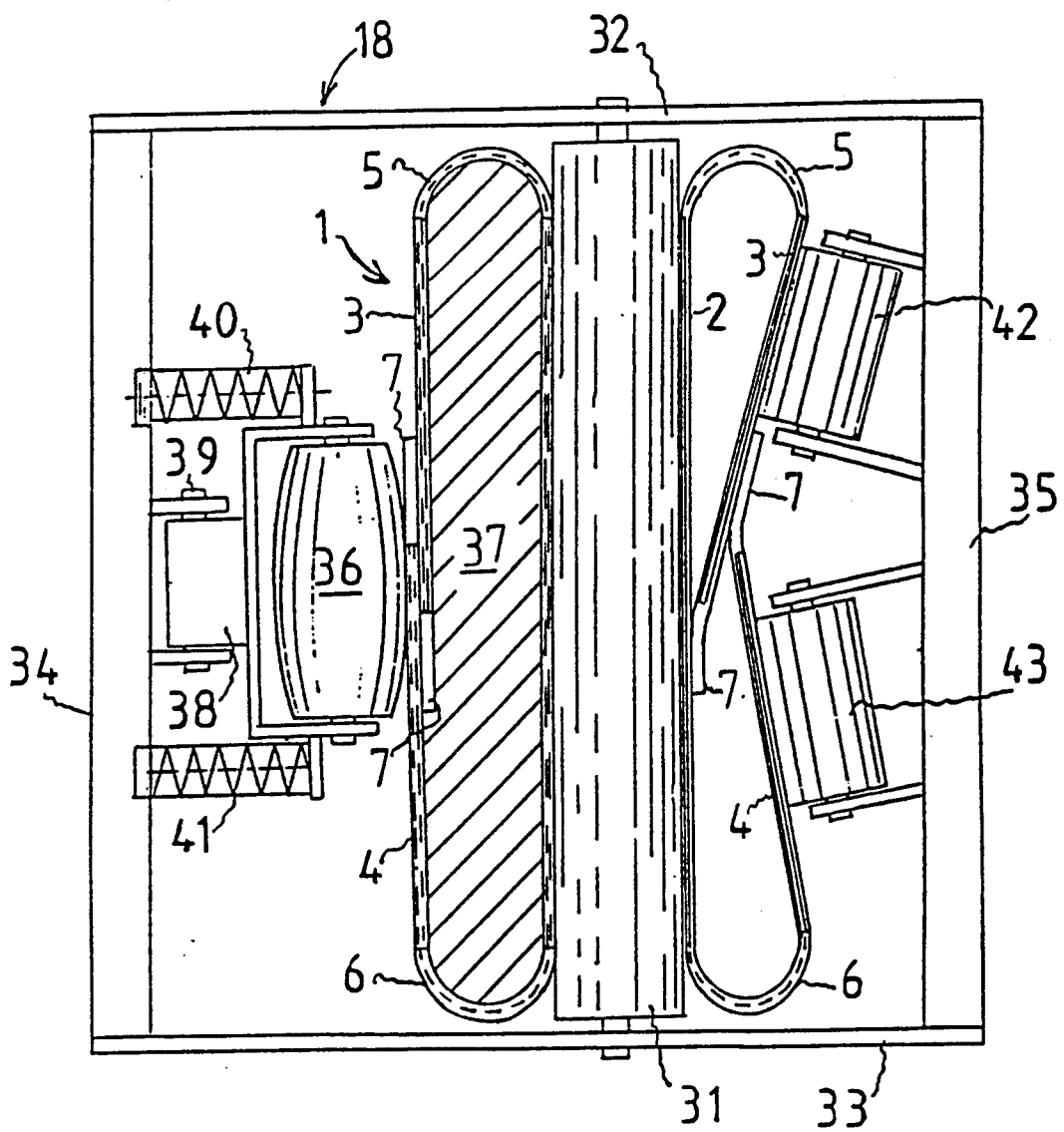
FIG. 12 is a cross-sectional view of a belt conveyor according to the invention, which uses a conveyor belt substantially as shown in FIGS. 3-6.
Figure 13:
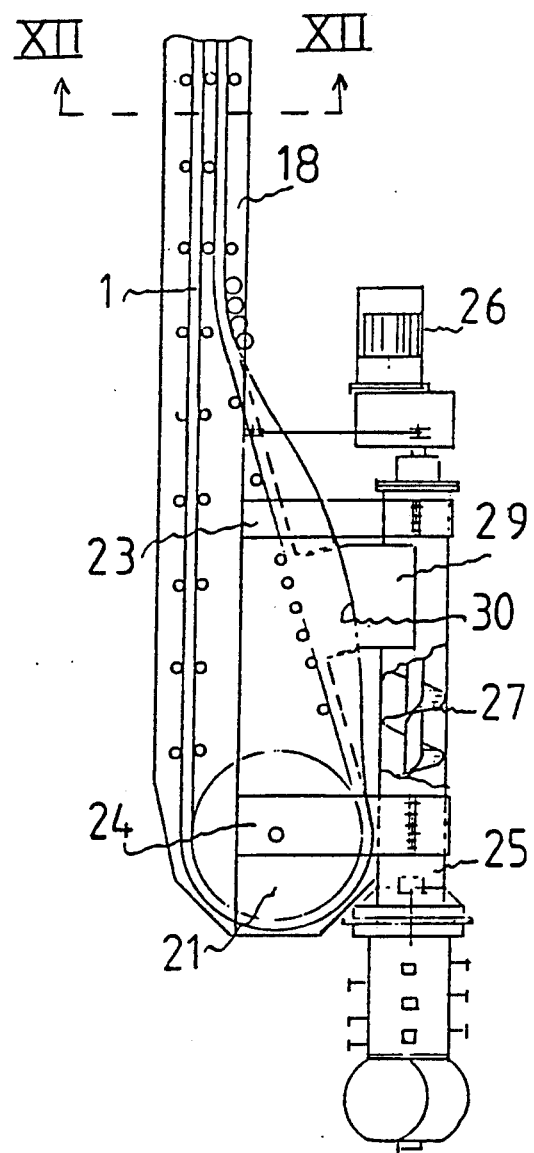
FIG. 13 illustrates the design of part of the belt conveyor according to the invention for the lower part of the belt in FIG. 10.
Figure 14:
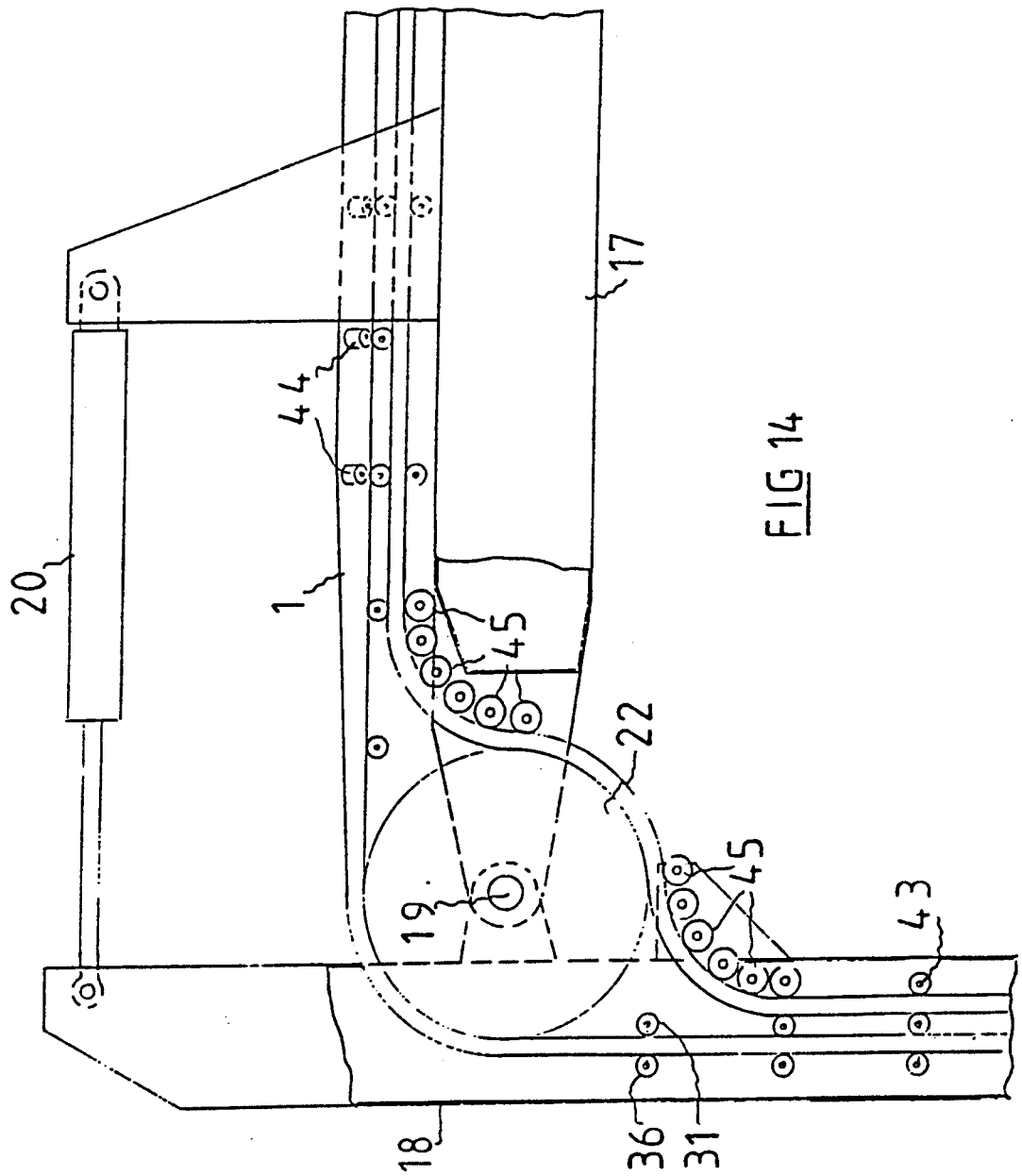
FIG. 14 shows an alternative embodiment of the transition between a vertical and a horizontal part of the belt path in the belt conveyor having a belt path as shown in FIG. 10.
Figures 15, 16:
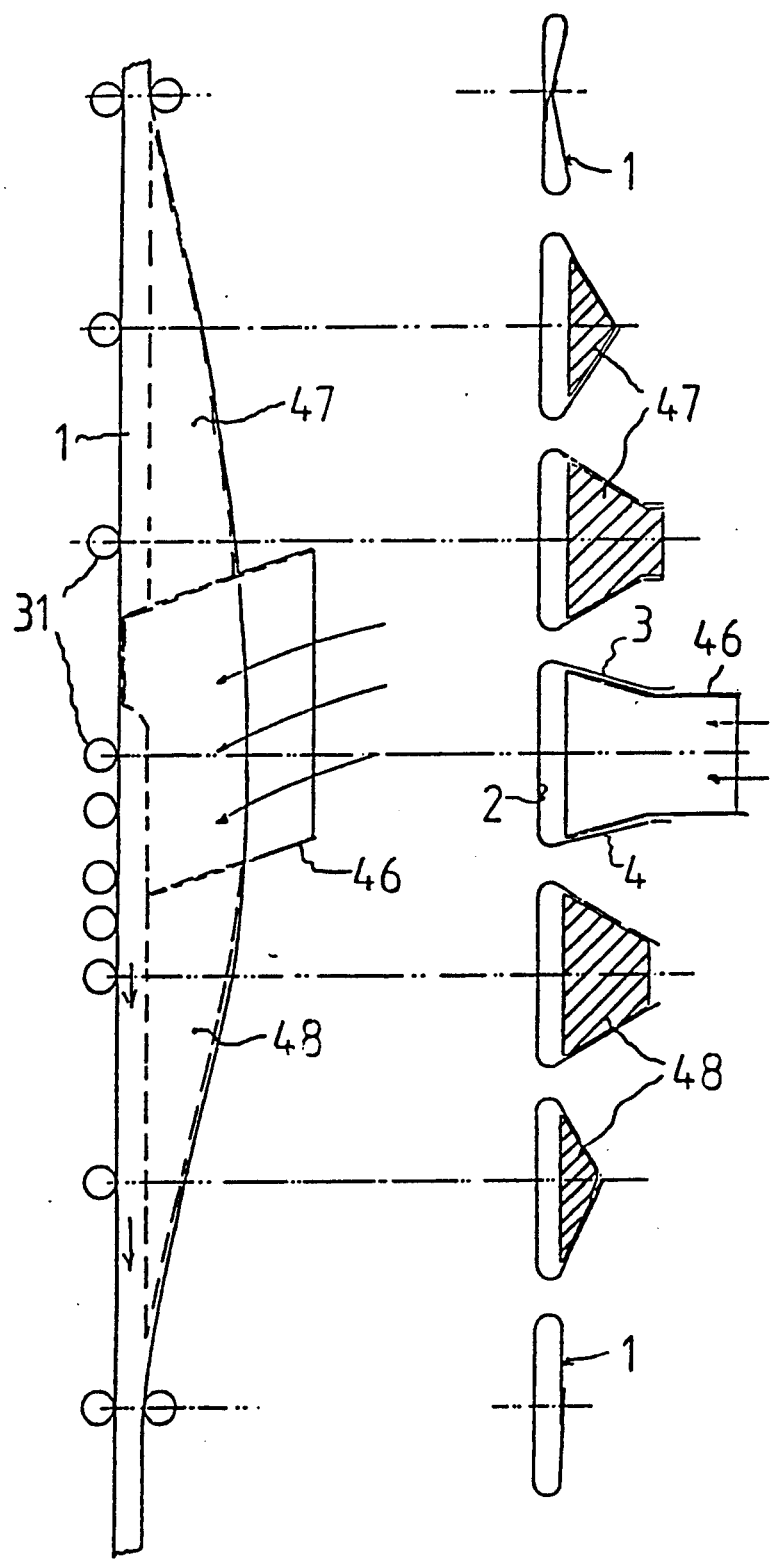
FIGS. 15 and 16 are a side view and a cross-sectional view, respectively, of a filling device in the belt conveyor according to the invention, comprising the downwardly running lower part of the belt in FIG. 10.

FIGS. 12-16 illustrate details of the belt conveyor with a belt path substantially as shown in FIG. 10. FIG. 12 is a cross-sectional view of the vertical part of the belt conveyor; FIG. 13 shows the lower part of the belt conveyor, i.e. part of the vertical path section 11, the turning point 13 and the filling station 14; FIG. 14 shows the transition between the vertical path section 11 and the horizontal path section 12; and FIGS. 15 and 16 show the filling station 14.

The conveyor shown in FIGS. 10 and 12-16 is mainly intended to unload bulk goods from ships. It comprises a jib 17 which is pivotable in a vertical plane about a horizontal shaft. This shaft can in turn be mounted in a tower which is turnable about a vertical shaft and which is arranged on a carriage drivable along a quay.

At the shown free end of the jib 17, the upper end of a substantially vertical stand 18 is pivotable about a horizontal shaft 19. A cylinder assembly 20 connected between the jib 17 and the stand 18 permits pivoting of the stand 18 out from the illustrated, completely vertical position.

The conveyor belt 1 extends from a lower deflecting roller 21 which is rotatably mounted at the lower end of the stand 18, upward along the stand 18 to a second deflecting roller 22 which is rotated about an axis coinciding with the shaft 19, and from the deflecting roller 22 along the jib 17 to a third deflecting roller (not shown) at the turning point and emptying station 15. From this third deflecting roller, the belt 1 follows a return run back to the deflecting roller 22 and from there, down to the deflecting roller 21.

By means of two cross bars 23, 24, a screw feeder 25 is fixedly connected with the lower part of the stand 18. The longitudinal axis of the screw feeder 25 is parallel with the longitudinal axis of the stand 18 and situated in a plane containing the stand 18 and the jib 17. Alternatively, the screw feeder 25 can be mounted to pivot about a horizontal axis. A motor 26 mounted above the screw feeder 25 drives the screw 27 thereof. The screw feeder 25 has a radially directed discharge opening 29 connecting with a filling hole 30 for the belt 1 in the filling station 14. The configuration of the inventive belt 1 and the positioning of guide rollers therefor along the stand 18 are shown in FIG. 12. A central roller 31 engages with the central part side which does not contact the goods, both along the goods conveying run and along the return run. The roller 31 is of a length slightly exceeding the width of the central part 2, and is rotated in side bars 32, 33 which together with an outer bar 34 and an inner bar 35 form a frame included in the stand 18. Along the goods conveying path, a cambered roller 36 presses the overlapping edge parts 3, 4 towards the central part 2. Thus, the central part 2, the edge parts 3, 4 and the hinge parts 5, 6 form a channel enclosing the goods 37. The roller 36 is more precisely rotatably mounted in one end of an arm 38 whose other end is pivoted about a shaft 39 which is fixed relative to the outer bar 34 and vertically spaced from the roller 36. Two compression springs 40, 41 strive to press the roller away from the outer bar 34 and towards the roller 31.

The edge parts 3, 4 may have flexible extension portions 7 to improve the closing of the channel in the overlapping area of the edge parts 3, 4. Most preferably, the belt 1 should however have the configuration shown in FIG. 4, the closing advantageously being effected by means of a spring-loaded and hinged longitudinal bar which thus replaces the rollers 36.

Along the return run, the edge part 3 is pressed by a roller 42 mounted adjacent the inner bar 35, towards the central part 2 and preferably to a completely folded condition in which the flexible extension portion 7 engages the central part side contacting the goods. In the same manner, the edge part 4 is pressed by a roller 43 mounted adjacent the inner bar 35, to a completely folded condition in which the flexible extension portion 7 sealingly contacts the side of the edge part 3 which does not contact the goods. The axes of rotation of the rollers 42, 43 extend substantially in parallel with the edge part 3 and 4, respectively.

Along the jib 17, the belt 1 has the same shape in its return run as along the stand 18. In the goods conveying run along the jib 17, the belt normally has the same shape, but the edge parts 3, 4 can also be more or less unfolded from the central part 2, while being guided by suitably angular guide rollers 44, as is best shown in FIG. 14. Before passing the deflecting roller at the turning point and emptying station 15, the edge parts 3, 4 are unfolded in the plane of the central part 2, such that the conveyed bulk goods are emptied above this deflecting roller which normally also forms a drive roller. After passing around said deflecting roller, the edge parts 3, 4 are again guided to the position folded towards the central part 2, as shown in FIG. 12.

The belt 1 travels around the deflecting roller 22 shown in FIG. 14 in a substantially unchanged shape, i.e. the shape shown in FIG. 12. This is possible in that the extensibility of the edge parts 3, 4 in the longitudinal direction of the belt 1 is made considerably greater than the extensibility of the central part 2 in the same direction. In its return run past the deflecting roller 22, the belt 1 is conducted by means of guide rollers 45 into contact with a portion of the deflecting roller 22, which is diametrically opposed to the portion of the deflecting roller 22 with which the belt 1 makes contact along the goods conveying run. When pivoting the stand 18 relative to the jib 17 by means of the cylinder assembly 20, an extension of one portion will thus correspond to an equally large abridgement of the other portion, such that the total length of the belt 1 remains constant. As a result, complicated belt stretching means are not required.

FIGS. 15 and 16 illustrate on a larger scale than FIG. 13 a device for filling bulk goods into the closed channel formed by the belt 1, the device being mounted above the deflecting roller 21 and between the belt 1 and the discharge opening 29 of the screw feeder 25. This device comprises, more precisely, a funnel 46 which forms the filling hole 30 and widens obliquely downward and inward towards the central part 2 of the belt 1 from the discharge opening 29 of the screw feeder 25. For opening the belt 1 about the funnel 46, the filling device further comprises a wedge-shaped body 47 which is directed upward from the funnel 46. To further facilitate a resetting of the edge parts 3, 4 to the overlapping condition after passing the funnel 46 without resistance from the goods entering via the funnel 46, the filling device further comprises a wedge-shaped body 48 which is directed downward from the funnel 46 and performs the function of the edge parts 3, 4, until the edge parts have returned to their overlapping condition. The body 48 will thus restrict the height of the charged goods above the central part 2 and constitutes a form of scraper.

The filling device shown in FIGS. 15 and 16 is also applicable along horizontal belt sections of the belt conveyor according to the invention, for example in the goods conveyor shown in FIG. 11 when used as a receiving conveyor.

Several modifications of the above described embodiment of the vertical conveyor according to the invention are possible within the scope of the invention. Thus, the vertical conveyor may include but a vertical section or other combinations of vertical and horizontal or inclined sections. Feeding of goods can also be performed in other ways than by means of a screw feeder, even if charging in a position above the lowermost deflecting roller 21 of the conveyor is preferred. The vertical conveyor according to the invention can also be designed such that the return run does not extend immediately adjacent and parallel to the goods conveying run. Then the rollers 31 cannot perform the double function as they do in the above described embodiment. The rollers 42, 43 could also be replaced by a suitably shaped single roller. Moreover, the rollers 36 may be replaced by some other type of pressing means, for example a slide bar extending along the entire vertical goods conveying run, said slide bar being spring-loaded against the belt 1 in the same manner as the rollers 36 and suitably divided into a plurality of sections hinged to each other. As a further alternative, an additional belt could be inserted between the rollers 36 and the belt 1, said additional belt having about the same width as the overlapping area and being provided with a strong longitudinal reinforcement, such that a safe closing is obtained in the overlapping area between the edge parts 3, 4.

Figure 17:
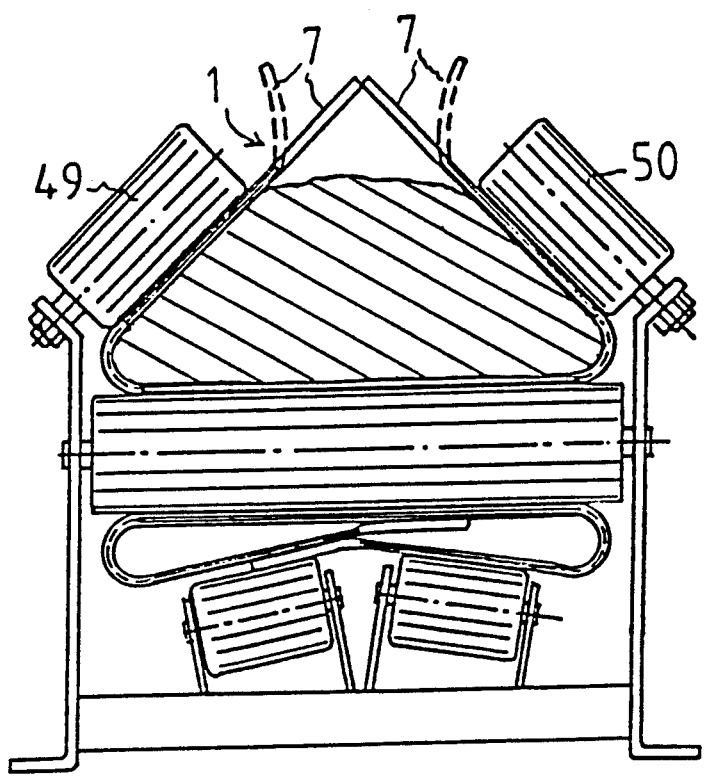
FIG. 17 is a cross-sectional view of the conveyor belt shown in FIG. 6 in the inventive belt conveyor.

FIG. 17 is a cross-sectional view of a horizontal or moderately inclined section of the belt conveyor according to the invention. Along the goods conveying run, the belt 1 is triangular in cross-section, and the edge parts 3, 4 comprise the flexible extension portions 7. Guide pressing rollers 49, 50 are used to maintain the triangular shape. The flexible extension portions 7 make it possible to arrange movable loading stations. A spool-shaped funnel corresponding to the funnel 46 in FIGS. 15 and 16 then opens the belt locally for filling which then closes again after having passed the funnel. Besides, the design complies with the one described with reference to FIG. 12.

Figure 18:
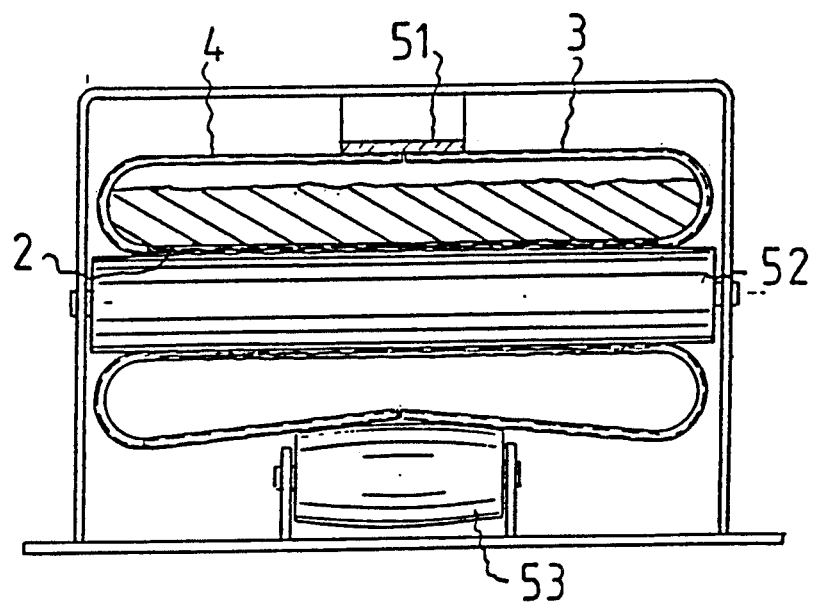
FIG. 18 is a cross-sectional view of the conveyor belt shown in FIG. 7 in the belt conveyor according to the invention.

FIGS. 18-20 are cross-sectional views of three different embodiments of the belt conveyor according to the invention which use the inventive conveyor belt, the total width of the edge parts 3, 4 of said conveyor belt being approximately equal to the width of the central part 2. As a result, these embodiments are only suited for conveying goods horizontally or in moderate inclinations, and not along narrow curves. The embodiment in FIG. 18 corresponds substantially to that shown in FIG. 12. However, a pressing bar 51 of a smaller width than that of a support roller 52 is here used, said support roller corresponding to the support roller 31 in FIG. 12. Further, the pressing rollers 42, 43 in the embodiment shown in FIG. 12 are replaced by a pressing roller 53 having a cambered section.

The embodiment shown in FIG. 19 corresponds, except for the total width of the edge parts and the absence of the flexible extension portions 7, to the embodiment shown in FIG. 17.

In the embodiment of the belt conveyor according to the invention as shown in FIG. 20, the belt 1 is guided by means of support rollers 54 and backing rollers 55 along the goods conveying run, and by means of support rollers 56, 57 along the return run. The support roller 54 presses the belt 1 against the support rollers 56, 57. All support and backing rollers 54-57 are rotatably mounted on shafts supported by a stand. Each stand is simple in design and comprises but two uprights connected by cross bars.

Along the goods conveying run, the edge parts 3, 4 are unfolded substantially through 90° relative to the bottom part 2, and the backing rollers 55 engaging with the outside of the edge parts 3, 4, hold the edge parts 3, 4 in this state. A cover plate 58 is mounted over the belt 1 and encloses the free edges of the edge parts 3, 4 by means of flanges.

According to the invention, the edge parts 3, 4 of the conveyor belt 1 are preferably folded inwards along the major part of the return run. As a result, goods-collecting channels or dirt pockets can be formed which prevent spilling of goods from the belt conveyor along the return run. A further reduction of the spilling of goods can be obtained in that the conveyor belt is caused to pass over deflecting rollers at the turning points of the belt conveyor, the edge parts 3, 4 being folded against the central part 2.

Figure 21:
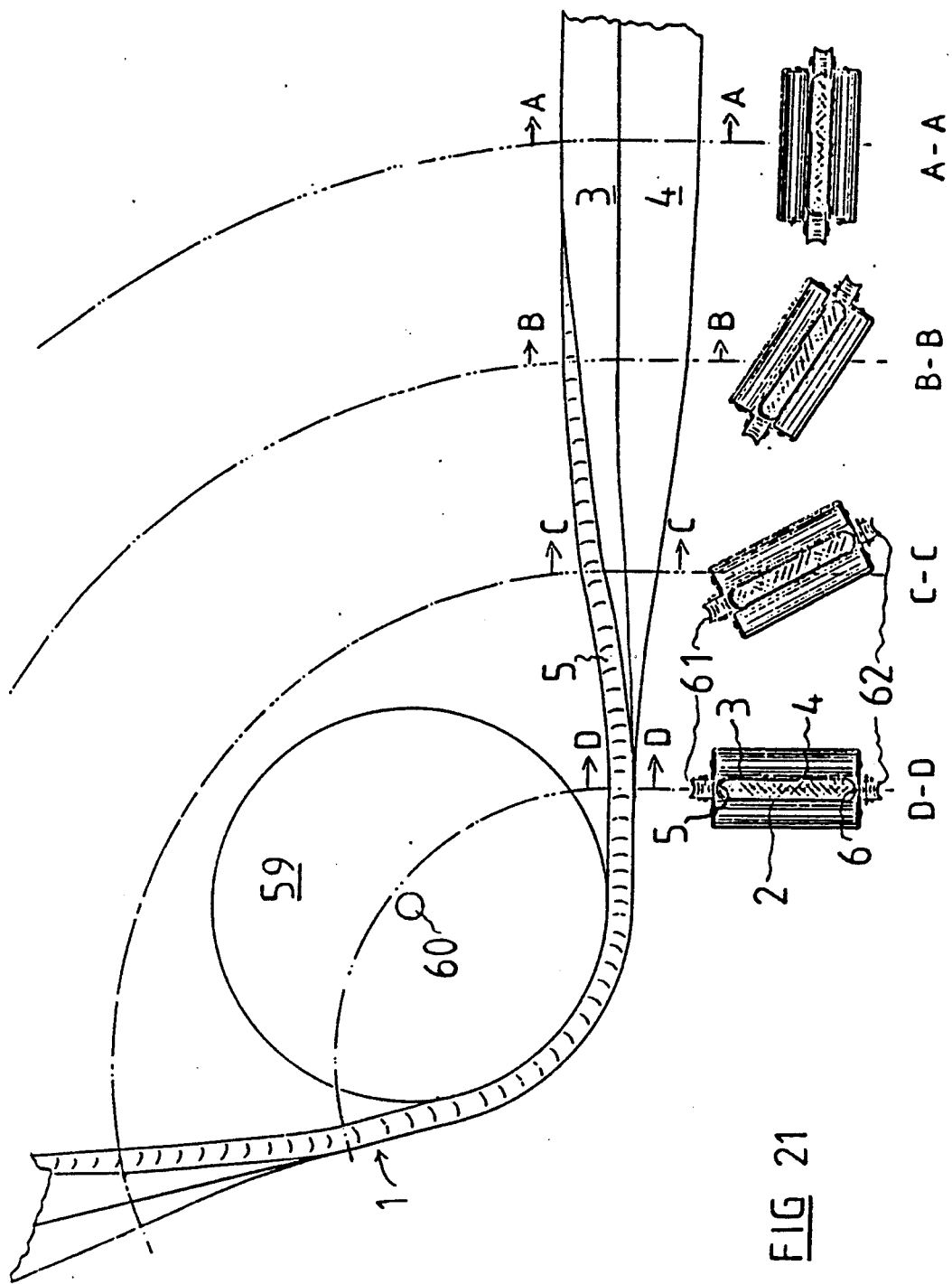
FIG. 21 is a plan view of the belt travel in a horizontal curve of the inventive belt conveyor.

FIG. 21 illustrates how the conveyor belt according to the invention with edge parts 3, 4 whose total width exceeds the width of the central part 2, can travel through very narrow horizontal curves, but also through narrow curves in other planes. In the curves, the special width relation between the central part 2 and the hinge parts 5, 6 of the belt is utilised. As a result, the belt has the shape of a planar package and can thereby be guided in a controlled manner with regard to its turning position relative to the longitudinal axis of the belt. When passing through a narrow curve, such as about a deflecting roller 59, the transverse direction of the belt 1 should be parallel to the curve axis or, in this case, the rotation axis 60 of the deflecting roller 59. This can alternatively be expressed in such manner that the transverse direction of the belt 1 in the actual curve should extend perpendicular to the plane of the curve. In FIG. 21, the curve of the belt is assumed to extend in a horizontal plane, so that the rotation axis 60 is vertical. Before and after the curve, the belt 1 assumes its preferred conveying position with the central part 2 extending horizontally and positioned below the edge parts 3, 4. From this position, the belt 1 is turned through 90° about its longitudinal axis to take the required position in which the transverse direction of the belt 1 is vertical in the curve. To establish the necessary seal in the curve, the overlapping portion of the downwardly directed edge part 3 should here be arranged inside the upwardly directed edge part 4. For additional guiding of the belt 1 during its turning about the longitudinal axis, additional guide rollers 61, 62 engaging with the hinge parts 5, 6 can be arranged, as illustrated in FIG. 21.

FIG. 22 illustrates a preferred variant of the lower part of the belt conveyor in FIGS. 10 and 13. When the belt 1 at a high speed leaves the deflecting roller 21 in FIG. 13, a sealing problem may occur in that the material of the hinge parts cannot instantaneously return after the extension to which the material has been subjected when passing around the deflecting roller 21. To eliminate this problem, the connection to the vertical conveying run therefore occurs via an outward convex, preferably parabolic curvature, i.e. a smooth transition to the vertical conveying run.

Figure 23:
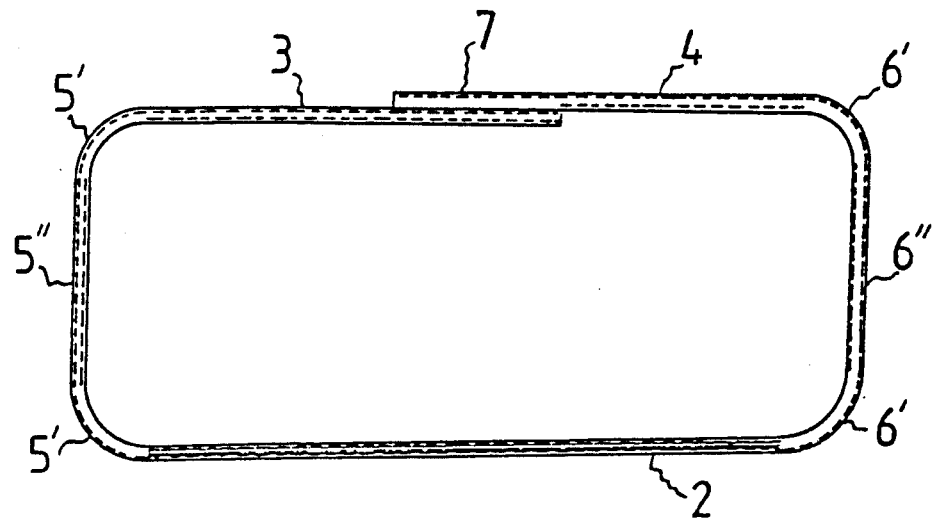
FIG. 23 shows a further cross-sectional shape of the inventive conveyor belt.

The cross-sectional shape of the inventive belt 1 as shown in FIG. 23 corresponds to the embodiment in FIG. 4, except that the hinge parts 5, 6 which in the above described embodiments are flexible across their entire width, are here divided into two flexible portions 5' and 6', respectively, and one intermediate portion 5" and 6", respectively, of the same design as the edge parts 3, 4.

Figure 24:
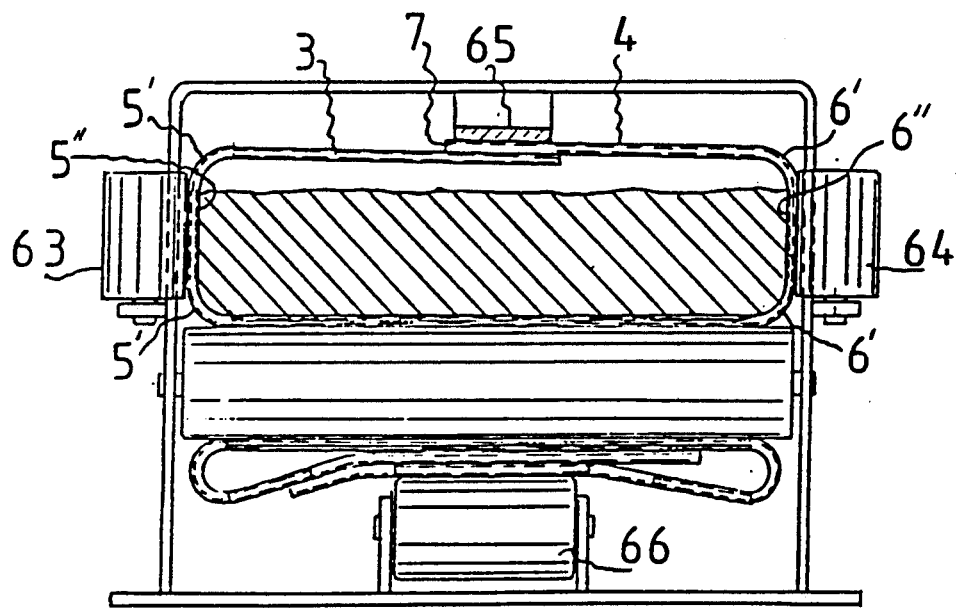
FIG. 24 is a cross-sectional view of the belt conveyor having the inventive conveyor belt.

The belt conveyor shown in FIG. 24, which uses the belt in FIG. 23, corresponds substantially to the one shown in FIG. 12, but requires additional lateral backing rollers 63, 64 for fixing the position of the intermediate portions 5", 6" of the hinge parts 5, 6. Moreover, use is made of a slide bar 65 for holding down the edge parts 3, 4, and a single roller 66 for pressing up the edge parts along the return run.

Further modifications of the embodiments according to the invention as described above are definitively possible within the scope of the invention, as stated in the appended claims. For example, the two edge parts need not have the same width, and the transverse and longitudinal reinforcements in the central part need not be separate but may comprise a single, combined reinforcement (cord).

What is claimed is:

1. A belt conveyor assembly comprising an endless conveyor belt of elastic material disposed in a conveying path, said conveying path having a conveying run portion and a return run portion, a plurality of support rollers for supporting the belt along at least part of said conveying path, and guide means for maintaining the desired shape of the belt, said guide means comprise pressing means, said conveyor belt comprises a planar central part, said central part having a first transverse reinforcement layer, said first transverse reinforcement layer providing flexural rigidity about the longitudinal axis of the belt, a longitudinal reinforcement layer, said longitudinal reinforcement layer providing low extensibility in the longitudinal direction of the belt;

a first and a second edge part, said first and second edge parts having a second and a third transverse reinforcement layer, respectively, said second and third transverse reinforcement layers providing flexural rigidity about the longitudinal axis of the belt, said first and second edge parts being extensible in the longitudinal direction of the belt and having a total combined width which is at least equal to the width of said central part;

a first and a second hinge part, said first hinge part integrally connecting one side of said central part to said first edge part, said second hinge part integrally connecting the opposite side of said central part to said second edge part, each said hinge part being flexible about the longitudinal axis of the belt, being extensible in the longitudinal direction of the belt, and being resilient for pivoting said corresponding adjacent edge part from a position folded towards said central part, each said hinge part having a substantially smaller width than said central part; and a fourth transverse reinforcement layer, said fourth transverse reinforcement layer being disposed to extend through said second edge part, said second hinge part, said central part, said first hinge part, and said first edge part, said fourth transverse reinforcement layer providing flexural rigidity to said central part and to said edge parts about the longitudinal axis of the belt.

2. The conveyor belt as claimed in claim 1, wherein said first, second, and third transverse reinforcement layers are spaced apart from said fourth transverse reinforcement layer in the direction of the belt thickness.

3. The conveyor belt as claimed in claim 2, wherein said longitudinal reinforcement layer of said central part is interposed between said first and fourth transverse reinforcement layers.

4. A conveyor belt of elastic material comprising:

a planar central part, said central part having a first transverse reinforcement layer, said first transverse reinforcement layer providing flexural rigidity about the longitudinal axis of the belt, a longitudinal reinforcement layer, said longitudinal reinforcement layer providing low extensibility in the longitudinal direction of the belt;

a first and a second edge part, said first and second edge parts having a second and a third transverse reinforcement layer, respectively, said second and third transverse reinforcement layers providing flexural rigidity about the longitudinal axis of the belt, said first and second edge parts being extensible in the longitudinal direction of the belt and having a total combined width which is at least equal to the width of said central part;

a first and a second hinge part, said first hinge part integrally connecting one side of said central part to said first edge part, said second hinge part integrally connecting the opposite side of said central part to said second edge part, each said hinge part being flexible about the longitudinal axis of the belt, being extensible in the longitudinal direction of the belt, and being resilient for pivoting said corresponding adjacent edge part from a position folded towards said central part, each said hinge part having a substantially smaller width than said central part; and a fourth transverse reinforcement layer, said fourth transverse reinforcement layer being disposed to extend through said second edge part, said second hinge part, said central part, said first hinge part, and said first edge part, said fourth transverse reinforcement layer providing flexural rigidity to said central part and to said edge parts about the longitudinal axis of the belt.

5. The conveyor belt as claimed in any one of claims 2, 3, or 4, wherein the resilience of said hinge parts is effected by said fourth transverse reinforcement layer.

6. The conveyor belt as claimed in any one of claims 2, 3, or 4, further comprising a first flexible extension portion, said first flexible extension portion being connected to and extending away from the free side edge of said first edge part.

7. The conveyor belt as claimed in any one of claims 2, 3, or 4, wherein the belt thickness is substantially the same over the entire width of the belt.

8. The assembly as claimed in claim 1, wherein said pressing means includes at least one pressing roller.

9. The assembly as claimed in claim 1, wherein said pressing means further includes at least one pressing roller and a longitudinal pressing bar.

10. The assembly as claimed in claims 1, 8 or 9, wherein said pressing means further includes holding rollers along at least part of said conveying run portion, said holding rollers being arranged to hold said edge parts at a right angle to said central part.

11. The assembly as claimed in claims 1, 8 or 9, wherein said pressing means are, at least along steeply inclined or vertical sections of said conveying run portion, arranged to hold said edge parts folded toward said central part in a position substantially parallel thereto.

12. The assembly as claimed in claim 11, wherein the total combined width of said edge parts is larger than the width of said central part.

13. The assembly as claimed in claim 12, wherein at least one said edge part has a flexible extension portion adjacent the free side edge of said edge part.

14. The assembly as claimed in claims 1, 8 or 9, wherein said belt is, along said return run portion, conducted with said central part positioned above said edge parts, said edge parts being pressed upward toward said central part such that the lowermost portion of each said edge part is positioned adjacent said respective hinge part.

15. The assembly as claimed in claim 12, wherein said belt is passed in said conveying path through curves with its transverse direction substantially parallel to the curve axis and, at the beginning of a curve, is turned about the longitudinal axis of the belt, if the transverse direction of said belt before the curve is not parallel to the curve axis.

16. The assembly as claimed in claim 15, wherein said belt is passed in said conveying path, at least through narrow curves, with said central part positioned inwardly of said edge parts.

17. The assembly as claimed in claim 16, wherein through horizontal curves in said conveying path where the transverse direction of said belt is vertical, the overlapping portion of each downwardly directed edge part is arranged inwardly of the upwardly directed edge part.

18. The assembly as claimed in claims 1, 8 or 9, wherein said edge parts are conducted in their folded condition about a deflecting roller at least at one turning point of said conveying path.

19. The assembly as claimed in claims 1, 8 or 9, further comprising a first belt guide means for unfolding said edge parts from said central part so as to form a filling hole, and a spool-shaped body arranged after said filling hole, for restricting the height of the charged goods above said central part.

20. The assembly as claimed in claims 1, 8 or 9, further comprising a substantially vertical stand, said stand having an upper end and a lower end and being provided with at least one support roller for supporting said belt, and a first deflecting roller disposed at said upper end of said stand, for deflecting said belt at an angle to said stand, said first deflecting roller having a substantially larger diameter than said support roller, said belt making contact with said first deflecting roller along two diametrically opposed portions thereof.

21. The assembly as claimed in claim 20, wherein said stand is pivotable about a horizontal axis which coincides with the rotation axis of said first deflecting roller.

22. The assembly as claimed in claim 20, further comprising a second belt guide means for unfolding said edge parts from said central part so as to form a filling hole, said second belt guide means being disposed along a downward extending section of said conveying path.

23. The assembly as claimed in claim 22, further comprising a substantially vertical screw feeder having an upper discharge opening which is connected with said filling hole.

24. The assembly as claimed in claim 23, wherein said screw feeder is mounted to pivot about a horizontal axis.

25. The assembly as claimed in claims 1, 8 or 9, further comprising a substantially vertical stand, said stand having an upper end and a lower end and being provided with at least one support roller for supporting said belt, and a second deflecting roller at said lower end of said stand, said second deflecting roller having a substantially larger diameter than said support roller, said conveying path extending upward having, from said second deflecting roller, an outward convex curvature.

26. The assembly as claimed in any one of claims 2, 3, or 4, wherein each said hinge part further includes a first and a second flexible section and an intermediate section, said fourth transverse reinforcement layer providing flexural rigidity to said intermediate section about the longitudinal axis of the belt.

27. The assembly as claimed in claims 1, 8 or 9, wherein each hinge part further includes a first and a second flexible sections and an intermediate section, said fourth transverse reinforcement layer providing flexural rigidity to said intermediate section about the longitudinal axis of the belt.

28. The assembly as claimed in claims 1, 8 or 9, wherein said pressing means further includes holding rollers along at least part of said conveying run portion, said holding rollers being arranged to hold said edge parts at an acute angle to said central part.

29. The assembly as claimed in claims 1, 8 or 9, wherein said pressing means are, at least along steeply inclined or vertical sections of said conveying run portion, arranged to hold said edge parts folded toward said central part in a position in engagement with said central part.

30. The conveyor belt as claimed in any one of claims 2, 3, or 4, further comprising a first flexible extension portion, said first flexible extension portion being connected to and extending away from the free side edge of said first edge part, and a second flexible extension portion, said second flexible extension portion being connected to and extending away from the free side edge of said second edge part.

31. The assembly as claimed in claim 29, wherein the total combined width of said edge parts is larger than the width of said central part.

32. The assembly as claimed in claim 31, wherein at least one said edge part has a flexible extension portion adjacent the free side edge of said edge part.

33. The assembly as claimed in claim 31, wherein said belt is passed in said conveying path through curves with its transverse direction substantially parallel to the curve axis and, at the beginning of a curve, is turned about the longitudinal axis of the belt, if the transverse direction of said belt before the curve is not parallel to the curve axis.

34. The assembly as claimed in claim 33, wherein said belt is passed in said conveying path, at least through narrow curves, with said central part positioned inwardly of said edge parts.

35. The assembly as claimed in claim 34, wherein through horizontal curves in said conveying path where the transverse direction of said belt is vertical, the overlapping portion of each downwardly directed edge part is arranged inwardly of the upwardly directed edge part.

* * * * *